(12) United States Patent
Carrerot

(10) Patent No.: US 9,375,592 B2
(45) Date of Patent: Jun. 28, 2016

(54) FLUID INJECTION DEVICE, AND MECHANICAL SYSTEM EQUIPPED WITH SUCH A DEVICE

(71) Applicant: SKF AEROENGINE FRANCE, Montigny le Bretonneux (FR)

(72) Inventor: Herve Carrerot, Vicq (FR)

(73) Assignee: SKF AEROENGINE FRANCE, Montigny le Bretonneux (FR)

( * ) Notice: Subject to any disclaimer, the term of this patent is extended or adjusted under 35 U.S.C. 154(b) by 310 days.

(21) Appl. No.: 13/705,485

(22) Filed: Dec. 5, 2012

(65) Prior Publication Data

US 2013/0140044 A1 Jun. 6, 2013

(30) Foreign Application Priority Data

Dec. 6, 2011 (FR) ..................................... 11 61230

(51) Int. Cl.
*A62C 13/22* (2006.01)
*F16N 11/00* (2006.01)
*F16N 11/10* (2006.01)
(Continued)

(52) U.S. Cl.
CPC ................ *A62C 13/22* (2013.01); *F16N 11/00* (2013.01); *F16N 11/10* (2013.01); *F16N 17/00* (2013.01); *F16B 39/22* (2013.01); *F16B 39/225* (2013.01)

(58) Field of Classification Search
CPC ....... A62C 13/22; F16B 39/22; F16B 39/225; F16N 11/00; F16N 11/10; F16N 17/00
USPC ..................................................... 184/29, 54
See application file for complete search history.

(56) References Cited

U.S. PATENT DOCUMENTS

| 6,959,548 B2 * | 11/2005 | Borg et al. ...................... 60/632 |
| 2007/0031207 A1 * | 2/2007 | Rosenbaum .................. 411/102 |
| 2008/0217107 A1 * | 9/2008 | Schmidt .......................... 184/39 |

(Continued)

FOREIGN PATENT DOCUMENTS

| FR | 1440498 A | 5/1966 |
| FR | 2890106 A1 | 3/2007 |

(Continued)

OTHER PUBLICATIONS

French Search Report, dated Jun. 28, 2012, which issued during the prosecution of French Patent Application No. 1161230.

*Primary Examiner* — William E Dondero
*Assistant Examiner* — Robert T Reese
(74) *Attorney, Agent, or Firm* — Troutman Sanders LLP

(57) ABSTRACT

A device for injecting a fluid into a mechanical system that may undergo heating, comprising at least one body containing a thermally triggered charge generating combustion gas, ignition of the charge being able to be triggered under the action of an ignition command and/or under the effect of a heat contribution, from a heating area of the body toward the charge, a reservoir containing the fluid, means for fastening the device to the mechanical system, the fastening means adapted to put the reservoir in fluid communication with the mechanical system, and means for delivering pressurized fluid outside the reservoir through the action, directly or through intermediate means, of the combustion gases. Within the device, the fastening means comprise at least one injection sleeve provided with an outer thread coated with an anti-loosening adhesive film. The invention also relates to a mechanical system equipped with at least one such device.

12 Claims, 6 Drawing Sheets

(51) Int. Cl.
   *F16N 17/00*   (2006.01)
   *F16B 39/22*   (2006.01)

(56)        References Cited

U.S. PATENT DOCUMENTS

2009/0123226 A1*  5/2009  Viegener .................. 403/268
   2009/0202364 A1*  8/2009  Bodart ................. A62C 13/22
                                                           417/158

2009/0218171 A1*  9/2009  Nicot ...................... 184/55.1
   2010/0101442 A1*  4/2010  Gauthier et al. ............ 102/356
   2010/0236694 A1*  9/2010  Kardasz ...................... 156/91

FOREIGN PATENT DOCUMENTS

FR           2911168 A1    7/2008
   WO        2008/107579 A2    9/2008

* cited by examiner

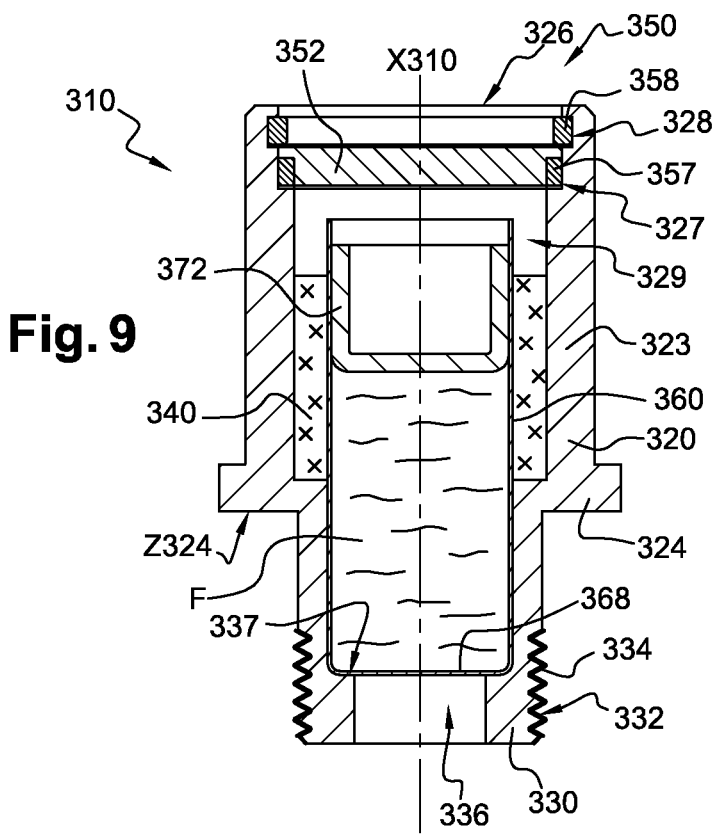
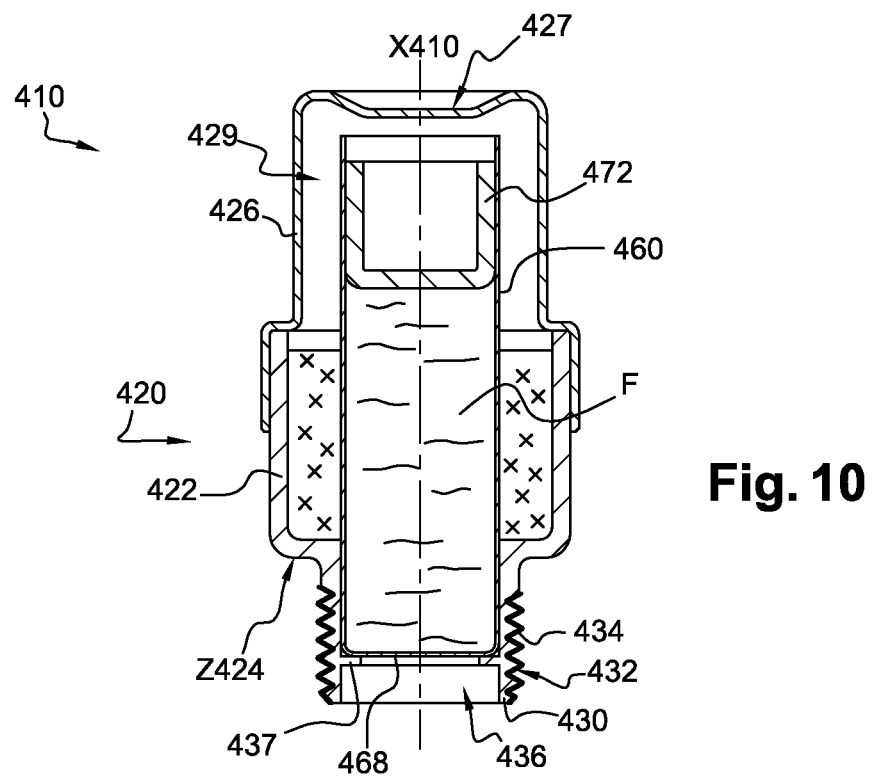

FLUID INJECTION DEVICE, AND MECHANICAL SYSTEM EQUIPPED WITH SUCH A DEVICE

CROSS REFERENCE TO RELATED APPLICATION

The present application claims priority to French Patent Application No. 11 61230 filed Dec. 6, 2011. The contents of the application are incorporated herein by reference in their entirety.

BACKGROUND

The present invention relates to a device for injecting a fluid into a mechanical system, for example an anti-friction bearing, main bearing or ball joint. The invention also relates to a mechanical system equipped with such a device. The invention relates to the field of security devices, in particular in the aeronautics field.

Mechanical systems of the rolling bearing, main bearing or ball joint type are commonly incorporated into all types of automobile, railroad, aeronautic or industrial machine equipment. For example, the mechanical system can be a ball bearing incorporated into an aeronautical device, such as a helicopter rotor.

In a known manner, such a mechanical system can undergo heating during operation. Beyond a critical temperature, certain component elements of the system can be irreparably damaged. The operation of the equipment into which the system is incorporated is then hindered, or even abruptly stopped. In certain cases, such a malfunction can therefore cause a serious accident.

In order to prevent or slow the heating of mechanical systems, a number of lubrication devices are known. Furthermore, the mechanical system can be provided with signaling devices, such as temperature sensors, making it possible to anticipate critical heating.

International Publication WO/2008/107579 ("PCT '579") describes a mechanical system equipped with an autonomous device for injecting a fluid, in particular a lubrication or cooling fluid, into the system in case of heating. The device comprises a thermally triggered pyrotechnic charge generating combustion gas arranged in a housing. The fluid is contained in a reservoir separated from the charge by a moving piston on the one hand, and from the system by a membrane on the other hand. By reaching a predetermined ignition temperature, the charge undergoes combustion and the generated gases pressurize the fluid in the reservoir. The membrane breaks under the pressure from the fluid, which is then injected into the mechanical system. The structure and operation of the device, as well as its thermal connection with the system, are outlined by PCT '579. However, the conditions for integration of the device into the system are not fully satisfactory.

The aim of the present invention is to propose an improved device for injecting a lubrication or cooling fluid. In particular, the invention targets a device that performs well and is reliable under demanding operating conditions, while being inexpensive and easy to implement.

SUMMARY

To that end, the invention relates to a device for injecting a fluid into a mechanical system that may undergo heating, the device having at least:

a body containing a thermally triggered charge generating combustion gas, ignition of the charge being able to be triggered under the action of an ignition command and/or under the effect of a heat contribution, from a heating area of the body toward the charge, a reservoir containing the fluid, means for fastening the device to the mechanical system, the fastening means being adapted to put the reservoir in fluid communication with the mechanical system, and means for delivering pressurized fluid outside the reservoir through the action, directly or through intermediate means, of the combustion gases.

According to the invention, the fastening means comprise at least one injection sleeve provided with an outer thread coated with an adhesive anti-loosening coating. The injection sleeve is formed from a material having a 0.2% deformation yield strength $Re_{0.2}$ comprised between 500 and 700 MPa on the one hand, and a tensile strength Rmax comprised between 700 and 900 MPa on the other hand. The means for delivering the pressurized fluid outside the reservoir comprise a non-fragmentable membrane, which initially covers the reservoir and breaks when the pressure of the fluid in the reservoir exceeds a predetermined pressure threshold. The membrane is located in a volume delimited by the outer thread of the injection sleeve. The flow rate of the pressurized fluid outside the reservoir is regulated, either with a periodic delivery of fluid over a reduced time interval, shorter than five seconds, or a regular and continuous delivery of fluid over a period of several minutes, or an intermittent delivery of fluid, through successive injections, over several minutes.

The invention thus makes it possible to improve the device's resistance to vibrational stresses, the sealing between the device and the mechanical system, and the precision of the delivery of the fluid in the system. The device is configured to operate under at least one mode of fluid delivery, advantageously predetermined according to the intended application. The device ensures a quick intervention in the event of heating of the system, in particular when the system is susceptible to undergo contact heating between its component elements during operation. Thus, the damage that may be suffered by the component elements of the system under the effect of critical heating is limited.

According to other advantageous features of the device according to the invention, considered alone or in combination:

The reservoir is housed in the body containing the charge, a moving piston is inserted between the fluid and the charge, and the injection sleeve protrudes from the body at the heating area of the body.

The reservoir is distinct from the body or bodies containing the charge(s), the intermediate compression means for compressing the fluid in the reservoir comprise at least one guide duct for guiding the combustion gases to a moving piston in contact with the fluid, and the injection sleeve protrudes from the reservoir.

The device comprises means for signaling the combustion of the charge.

The device comprises a miniaturized electronic unit for transferring information to a remote central unit.

The device is autonomous, the ignition of the charge being able to be triggered only under the effect of a heat contribution, from a heating area of the body, toward the charge.

The invention also relates to a mechanical system, for example an anti-friction bearing, a main bearing, or a ball joint, equipped with at least one device as described above.

According to other advantageous features of the system according to the invention, considered alone or in combination:

The injection sleeve of the device is screwed into a tapped hole formed in the mechanical system.

The tapped hole is formed in a part of the system made from a steel having a tensile strength comprised between 2400 and 2600 MPa, still more preferably approximately 2500 MPa.

The mechanical system is equipped with several devices each provided with at least one charge having a different triggering temperature from the other charges.

At least one positive braking element cooperating with a device is integrated into the mechanical system.

The positive braking element is of the sheet metal brake type.

The positive braking element is of the locking type.

BRIEF DESCRIPTION OF THE DRAWINGS

The invention will be better understood upon reading the following description, provided solely as a non-limiting example and done in reference to the appended drawings, in which:

FIG. 9 is a cross-sectional view similar to FIG. 2 of a device according to a further example of the invention;

FIG. 10 is a cross-sectional view similar to FIG. 2 of a device according to another example of the invention;

DETAILED DESCRIPTION

Figure 1:
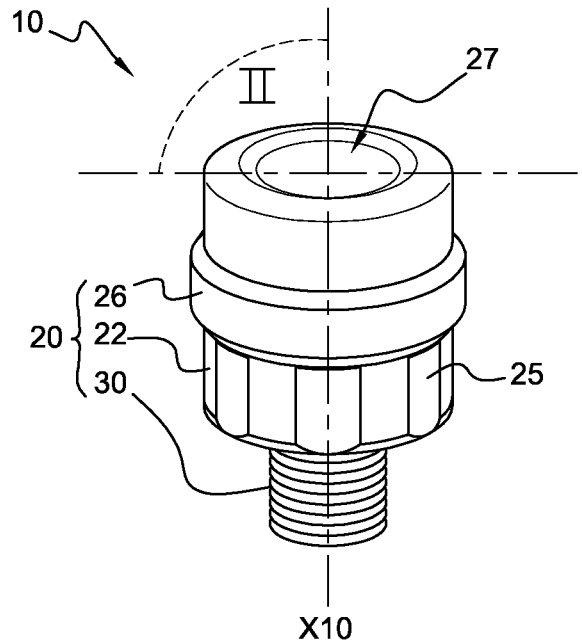
FIG. 1 is a perspective view of an autonomous device for injecting fluid, said device being according to the invention.
Figure 2:
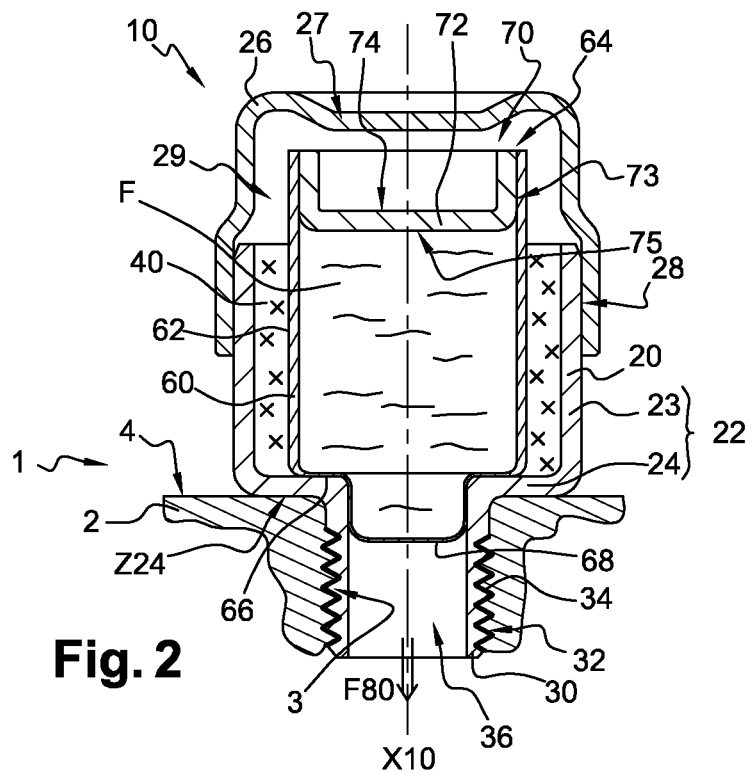
FIG. 2 is an axial cross-sectional view of the device in plane II of FIG. 1, equipping a mechanical system, partially shown, also according to the invention.
Figure 3:
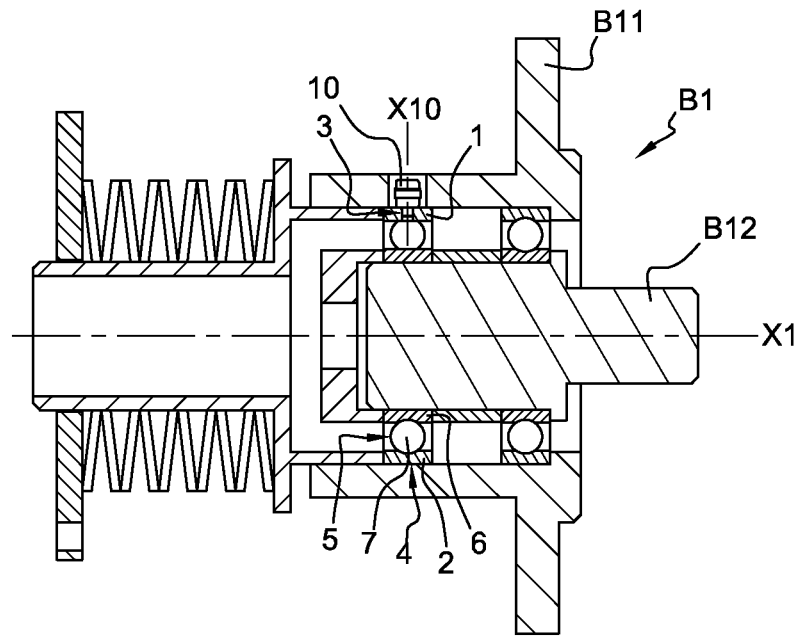
FIG. 3 is a smaller scale cross-sectional view of the device and the system of FIG. 1, integrated into a test bench implemented during a preparatory phase for the manufacture of the device.

FIGS. 1 to 3 show an autonomous device 10 according to the invention for injecting a fluid F.

More specifically, the device 10 is a miniaturized cartridge designed to equip a mechanical system 1, also according to the invention, that may undergo heating. The system 1 is partially shown in FIG. 2 for simplification purposes on the one hand, and is fully shown in FIG. 3, integrated into a test bench B1, on the other hand.

In the example of FIGS. 2 and 3, the system 1 is of the ball bearing type, with an outer ring 2 and an inner ring 6, stationary and rotating respectively during operation of the bench B1. An at least partially tapped orifice 3 passes through the ring 2, connecting an outer surface 4 and an inner space 5 to said ring 2. Ball bearings 7 are housed inside 5 the system 1, along a raceway formed between the rings 2 and 6. Preferably, the rings 2 and 6 are made from a steel with a very high hardness, having a tensile strength comprised between 2400 and 2600 megapascal (MPa), still more preferably approximately 2500 MPa. The bench B1 comprises a stationary portion B11 secured to the ring 2 and a moving portion B12 secured to the ring 6. In this way, the portion B12 and the ring 6 can be rotated around an axis X1, the system 1 then performing its anti-friction function.

During operation of the system 1, the cartridge 10 aims to protect the inside 5 and the moving parts 6 and 7 from heating. To that end, the fluid F is on the one hand initially contained in the cartridge 10 at rest, and on the other hand injected from the cartridge 10 toward the system 1, under certain operating conditions, during operation of the system 1 and the cartridge 10.

In one alternative not shown, the system 1 may be another mechanical system that may undergo heating, for example a ball joint or a main bearing.

According to another alternative not shown, the cartridge 10 may be positioned at another location of the system 1, for example on a front surface.

The cartridge 10 includes a body 20, a sleeve 30 for fastening the cartridge 10 to the mechanical system 1, a thermally triggered charge 40 that may generate combustion gas, a reservoir 60 adapted to contain the fluid F, means 68 for delivering the fluid F outside the reservoir 60, as well as intermediate means 70 for compressing the fluid F in the reservoir 60. The cartridge 10 is generally axially symmetrical around a central axis X10.

The body 20 is centered on the axis X10 and comprises a base 22, a cover 26, and the sleeve 30 secured to the base 22. The base 22 comprises a cylindrical wall 23 centered on the axis X10 and a radial wall 24 perpendicular to the axis X10. Optionally, the wall 23 has an outer surface provided with ribs 25 facilitating handling of the body 20. A heating area Z24 is delimited on the outer side of the wall 24, around the sleeve 30. Said area Z24 is provided to be positioned in contact with the outer surface 4 of the system 1, so that a heat transfer can occur through the wall 24 from the system 1 toward the charge 40. The base 22 is preferably made from a metal material with a high thermal conductivity, such as a copper, zinc and/or aluminum alloy, for example brass.

The cover 26 forms a basin, whereof the section in a plane containing the axis X10 generally forms an inverted U. The base 22 and the cover 26 together delimit a housing 29 formed inside the body 20. Arranged in the housing 29 are the charge 40, the means 70, and the reservoir 60 containing the fluid F, the rest initially being filled with non-pressurized air. The base 22 and the cover 26 are assembled to one another and secured at a junction area 28, for example by welding or gluing. In the example of FIG. 2, the wall of the cover 26 partially covers the wall 23 of the base 22. As a non-limiting example, the maximum diameter of the body 20 at the junction area 28 is approximately 20 mm. The cover 26 can be made from a less expensive material than the base 22.

Preferably, the cover 26 has, at its apex, i.e. at the hollow portion of the U, a portion 27 that can be deformed under the effect of a pressure inside the body 20, when the combustion gas of the charge 40 is diffused in the housing 29. The strength of the portion 27 may be reduced under the effect of a heat treatment prior to assembling the cover 26 on the base 22, or by decreasing the thickness of the portion 27 relative to the rest of the cover 26, or using any other means suited to this application. Alternatively, the portion 27 may be an element fastened on the cover 26, for example made from a plastic that is plastically deformable without breaking under the pressure and temperature of the combustion gases of the charge 40. Thus, the combustion of the charge 40 can be detected visually from outside the cartridge 10, for example during a maintenance operation, the portion 27 then being deformed toward the outside of the body 20.

The sleeve 30 is secured to the base 22 and protrudes from the wall 24, on the side opposite the cover 26. More specifically, the sleeve 30 forms a cylindrical wall centered on the axis X10 and having an outer thread 32 on the one hand, and an inner bore on the other hand delimiting a duct 36 for delivering the fluid F outside the cartridge 10. As one non-limiting example, the outer diameter of the sleeve 30 is approximately 6 mm. In order to ensure optimal fastening of the cartridge 10 to the system 1, the outer thread 32 is coated with an anti-loosening adhesive film 34, then screwed into the corresponding orifice 3 of the system 1, with a controlled torque. The orifice 3, specifically provided to receive the sleeve 30, is at least partially tapped. As one non-limiting example, the film 34 applied on the thread 32 may be a glue or an adhesive paste with a strong adhesive power, in particular a cyanoacrylate glue.

The body 20, and in particular the sleeve 30, are configured to ensure optimal operating efficiency of the cartridge 10 and the mechanical system 1. In particular, the material and expense of the area Z24, the material and the dimensions of the sleeve 30, the dimensional precision and the strength of the thread 32, the nature and quantity of film 34 applied on the thread 32, and the tightening torque of the threaded sleeve 30 in the orifice 3 of the system 1 are particularly important for the implementation of the cartridge 10. The sleeve 30 makes it possible to integrate the cartridge 10 into the system 1 while ensuring satisfactory strength of the cartridge 10 with respect to the vibrational stresses transmitted to it by the system 1, satisfactory sealing of the system 1 at the orifice 3, and delivery of the fluid F into a specific area of the inside 5 of the system 1. The area Z 24 allows rapid and precise ignition of the charge 40 in response to critical heating of the system 1. In this way, the cartridge 10 has a reduced response time, ensures rapid intervention in the event of heating of the system 1, and limits the damage potentially suffered by the component elements of the system 1 under the effect of critical heating.

Advantageously, the sleeve 30 is made from a material having a 0.2% deformation yield strength $Re_{0.2}$ comprised between 500 and 700 MPa, preferably between 550 and 650 MPa, still more preferably approximately 600 MPa. Furthermore, the material of the sleeve has a tensile strength Rmax comprised between 700 and 900 MPa, preferably between 750 and 850 MPa, still more preferably approximately 800 MPa. Such mechanical characteristics can for example be obtained with a steel alloy, with or without thermal treatment. Thus, the sleeve 30 and its thread 32 have a satisfactory strength with respect to the mechanical, vibrational and thermal stresses undergone in contact with the system 1.

Complementarily, a positive braking element, not shown, may be integrated into the system 1. This element is for example of the sheet metal brake or lockwire type and cooperates with the cartridge 10, so as to avoid unscrewing of said cartridge 10 under the action of the vibrations of the system 1 during operation.

The reservoir 60 comprises a cylindrical wall 62 that is centered on the axis X10 and extends between an open end provided with a circular opening 64 and a closed end formed by a radial wall 66. Preferably, the reservoir 60 suitable for storing the fluid F is made from a material with a lower thermal conductivity than the material of the body 20 receiving the charge 40. In this way, the fluid F to be injected can be preserved from any heating that may come from heating of the system 1 to be protected, at the heating area Z24. For example, the reservoir 60 may be made from a light material, such as a plastic.

A membrane 68, for example made up of a frangible plastic or metal film, is formed on the wall 66 of the reservoir 60. When the reservoir 60 is positioned on the base 22, the wall 66 presses on the inner surface of the wall 24, while the membrane 68 protrudes inside the duct 36, perpendicular to the axis X10. The membrane 68 is then located in the volume delimited by the contours of the thread 32, advantageously being brought closer to the outlet end of the duct 36 and the inside 5 of the system 1. Alternatively, the membrane 68 may be formed in the same plane as the wall 66, or may completely replace the wall 66. The membrane 68 performs a first function of sealing the reservoir 60 and a second function of delivering, after rupture, fluid F outside the reservoir 60. The membrane 68 and the duct 36 constitute the means for delivering the fluid F outside the reservoir. The sleeve 30 may be described as an injection sleeve, inasmuch as it is passed through by the fluid F when the latter is delivered.

Preferably, the membrane 68 is non-fragmentable in case of rapture, in other words configured to tear without fragments under the pressurization force of the fluid F in the reservoir 60. In fact, the migration of membrane fragments 68 toward the inside 5 of the system 1 via the duct 36 would risk damaging the system 1.

In the example of FIG. 2, the compression means 70 are inserted between the fluid F and the housing 29 containing the charge 40. These means 70 are necessary when the mixture of the combustion gases with the fluid F to be injected is troublesome and/or when the injection of the mixture of combustion gas and fluid F can be problematic. More specifically, the means 70 comprise a piston 72 initially positioned in the reservoir 60 at the opening 64. The piston 72 is provided with a lateral cylindrical wall 73 bearing against the wall 62, on a first side 74 oriented toward the housing 29 and with a second side 75 oriented toward the inside of the reservoir 60 and the fluid F. The second side 75 is initially positioned in contact with the fluid F, which is then subjected to a zero or low pressure. When combustion gases are released from the charge 40, the pressure increases in the housing 29, destroying the equilibrium between the pressure exerted by the fluid F on the side 75 and the pressure exerted by the gases on the side 74. The piston 72 moves in the reservoir 60 with the wall 73, which slides against the wall 62, compressing the fluid F until the membrane 68 breaks. Then, the piston 72 continues to push into the reservoir 60, with a flow F80 of the fluid F that escapes the reservoir 60 through the pierced membrane 68, toward the duct 34 and the mechanical system 1.

In an alternative not shown in FIGS. 1 and 2, the means 70 may comprise a deformable membrane, or any other element suited for this application.

The fluid F may be a lubrication, protection, or cooling agent for the component elements of the mechanical system 1. The fluid F may consist of a liquid, emulsion, gel, oil, or paste, potentially charged with solid elements such as powders. The fluid F may also consist of a mixture of several fluids of different natures, in particular a mixture of at least two fluids chosen from among those listed above. As an example, the fluid F is an oil suited for emergency oiling of a mechanical bearing. In other words, the fluid F may be any type of active agent or mixture of agents suitable for the applications covered by the invention. The characteristics of the fluid F, in particular its viscosity, lubricating potential and/or cooling potential, are preferably chosen specifically for the targeted application.

The charge 40 is positioned in the housing 29 of the body 20, between the wall 23 of the base 22 and the wall 66 of the reservoir 60. The exact volume of the housing 29 occupied by the charge 40 depends on its composition, and therefore the targeted application. The rest of the housing 29 is occupied by air when the cover 26 covers the base 22. Alternatively, the charge 40 may occupy a more or less significant portion of the housing 29.

The charge 40 generates combustion gas when it burns above a predetermined temperature. Known from PCT '579 are thermally triggered charges, the ignition of which may result from an outside heat contribution or may be triggered by a remotely controlled ignition. Parameters such as the quantity and composition of the charge 40 influence the injection kinematics of the fluid F. The choice of the material for the base 22, in particular at the area Z24, also participates in controlling the response time the lapsing between the moment when abnormal heating of the system 1 takes place, the moment of detection of that abnormal heating corresponding to ignition of the charge 40, and the injection moment of the fluid F into the system 1. Once the ignition is done, the charge 40 burns quickly, between several milliseconds and several seconds.

The management of the different aforementioned parameters makes it possible to set the formal triggering temperature, control the quantity of gas generated and the pressure of the gases before injection of the fluid, from several bars to several hundreds of bars, control the combustion time of the charge 40, and control the length and flow rate of delivery of the fluid F. The parameterization of the cartridge 10 may in particular be optimized to avoid premature injection of the fluid F due to untimely temperature spikes. In other words, an adjustable ignition delay of the charge 40 makes it possible not to trigger auto-triggering of the composition during periodic overheating of the system 1 not characteristic of a malfunction.

The generation of combustion gases of the charge 40 may correspond to two primary embodiments. According to a first embodiment, the gas comes only from the combustion of a thermally triggered charge 40 generating gas, for example mixing thermite and gas-generating compounds. According to a second embodiment, the gas comes from the serial combustion of superimposed charges, which comprise variable portions of thermally triggered compounds under the effect of the heat contribution of the system 1, gas-generating compounds, and compounds acting as ignition relays. For example, in this second embodiment, the charge 40 may comprise a first thermally triggered combustion stage, a second ignition relay stage, and a third combustion gas generating stage.

Preferably, the device 10 is autonomous, i.e. provided with no ignition controller. In that case, the ignition of the charge 40 is triggered only under the effect of the heat contribution, from the heating area Z24 of the body 20 toward the charge 40.

Alternatively, the device 10 may be equipped with a remote ignition control.

In practice, the pressure increase of the fluid F in the reservoir 60 is ensured by the membrane 68, the piston 72, and the combustion gases. The fluid F is released from the reservoir 60 when the membrane 68 is torn, when the pressure of the fluid F in the reservoir 60 increases above a predetermined pressure.

Figure 4:
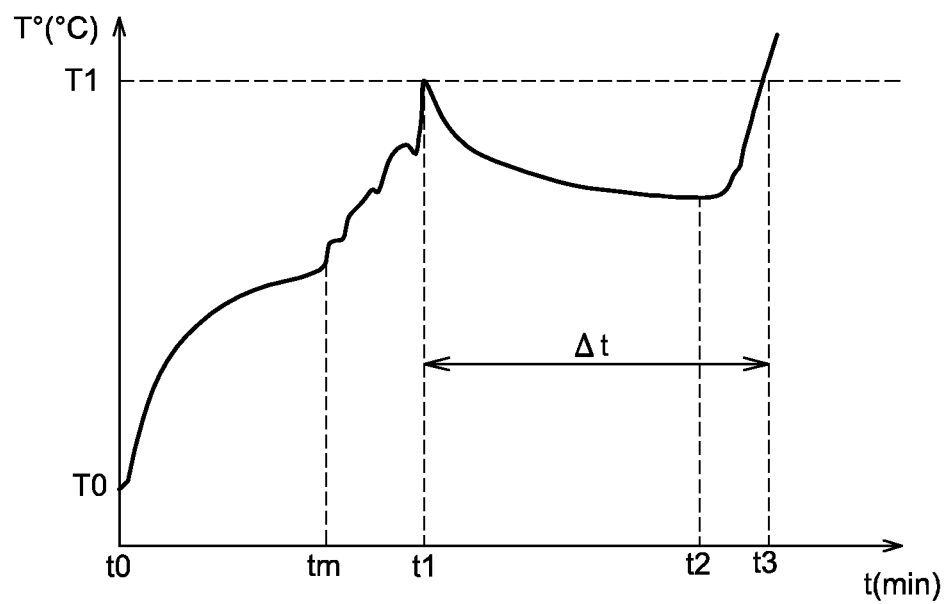
FIG. 4 is a graph illustrating the operation of the device of FIGS. 1 and 3.
Figure 5:
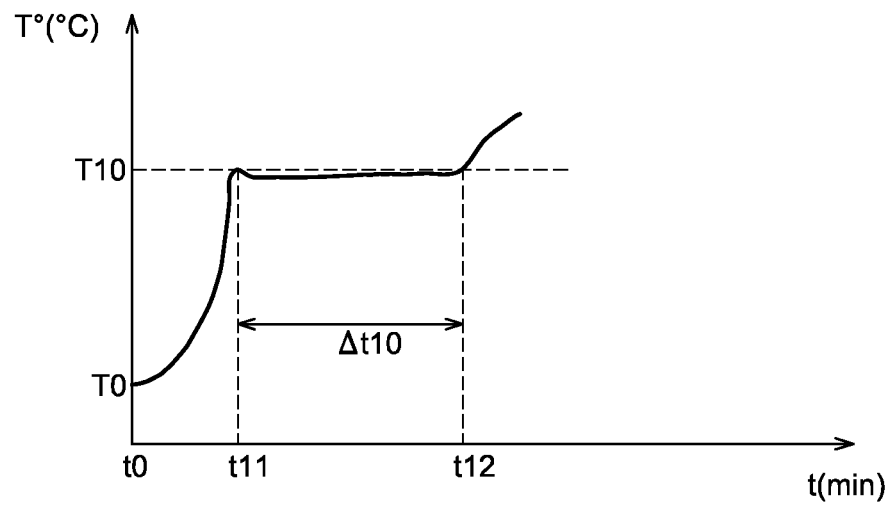
FIG. 5 is another graph illustrating the operation of the device of FIGS. 1 and 3, with a different parameterization.
Figure 7:
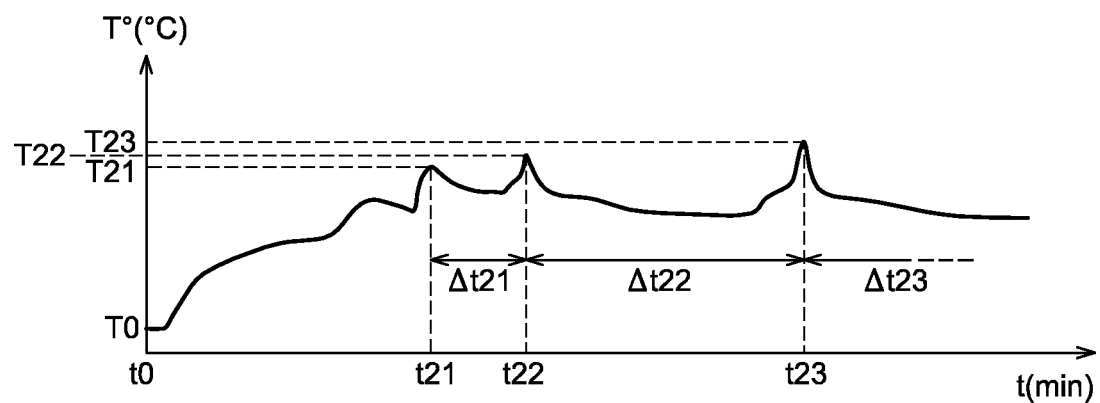
FIG. 7 is a graph illustrating the operation of the devices and the system of FIG. 6.

Furthermore, the test bench B1 may be used to test different parameterizations of the cartridge 10, during a preparatory phase for manufacture of the cartridge 10 that will ultimately be integrated into the system 1, as explained hereafter relative to FIGS. 4, 5 and 7.

FIG. 4 shows a graph illustrating the operation of the cartridge 10 with a given parameterization.

To that end, the cartridge 10 is fastened on the anti-friction bearing 1, which in turn is mounted on the test bench B1, as shown in FIG. 3. The graph of FIG. 4 shows a temperature $T°$ in degrees Celsius (° C.) of the anti-friction bearing 1 as a function of the time t in minutes (min). More specifically, the evolution of the temperature T1 is measured at the outer surface 4 by a measuring probe connected to a computer, not shown for simplification reasons.

In order to reproduce the targeted aeronautic applications, the test is conducted with a strong charge exerted on the anti-friction bearing 1, i.e. a contact pressure between the rings 2, 6 and the balls 7 comprised between 2.5 and 2.8 MPa, as well as a high speed of rotation around the axis X1, in the vicinity of 10,000 revolutions/minute. The anti-friction bearing 1 is an anti-friction bearing manufactured from material 100C6, with a bore of 30 mm and balls with diameters of 7.144 mm.

The rotation of the inner ring 6 starts at initial moment t0, where the surface 4 has a temperature T0 corresponding to the ambient temperature and pressure conditions. The temperature $T°$ increases rapidly in the anti-friction bearing 1 during operation, then more gradually, until, at a moment tm, first bonds appear inside the anti-friction bearing 1. The temperature $T°$ continues to increase up to a moment t1 corresponding to a temperature T1 for triggering the cartridge 10. As an example, the moment t1 occurs after approximately 30 minutes, while the temperature T1 is approximately 135° C. Between ignition of the charge 40 and injection of the fluid F into the anti-friction bearing 1, a duration in the vicinity of several seconds elapses, negligible on the scale of the graph. The heat divergence, reflecting the imminent seizing of the anti-friction bearing 1 by bonds, is stopped. The temperature $T°$ drops again immediately and for several minutes, under the effect of the fluid F delivered to the inside 5 of the anti-friction bearing 1. Lastly, the temperature $T°$ begins to increase again at a moment t2, where the fluid F is dissipated and/or its effects are no longer sufficient to prevent heating of the anti-friction bearing 1. At a moment t3, the temperature $T°$ again reaches the temperature T1, but without a new injection of fluid F being possible.

At that stage, the readings indicate that the use of the cartridge 10 gave the anti-friction bearing 1 an operating suspension during an interval Δt of approximately 30 minutes, between the moments t1 and t2. In other words, the operating time of the anti-friction bearing 1 is doubled owing to the cartridge 10.

FIG. 5 shows a graph illustrating the operation of the cartridge 10, with a different parameterization from that of FIG. 4.

The cartridge 10 is triggered at a moment t11 and a temperature T10 and ceases producing effects at a moment t12. As an example, the moment t11 occurs after approximately 30 minutes, while the temperature T10 is approximately 135° C. Between t11 and t12, during an interval Δt10, the temperature $T°$ substantially maintains a plateau slightly lower than T10. The parameterization of the cartridge 10 allows distribution of the fluid F in the anti-friction bearing 1 throughout the entire interval Δt10. For example, the nature of the fluid F is such that its redistribution in the anti-friction bearing 1 is slow and gradual, and its effects are extended over the entire interval Δt10. According to another example, the configuration of the cartridge 10 is such that the injection of the fluid F into the anti-friction bearing is slow and gradual throughout the entire interval Δt10. As an example, the interval Δt10 is approximately 30 minutes.

Figure 6:
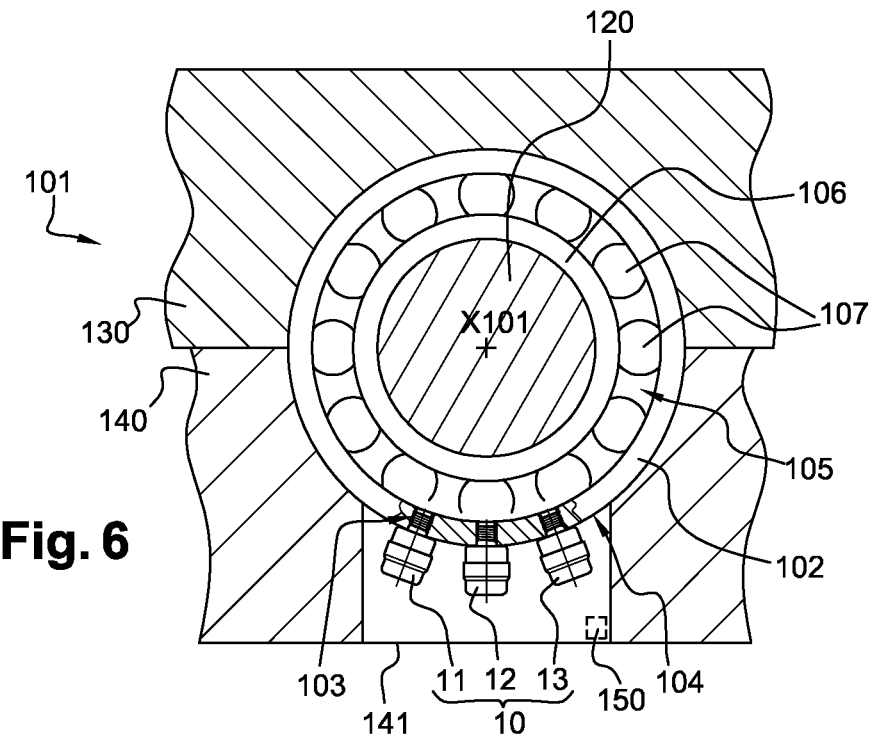
FIG. 6 is a cross-sectional view of another mechanical system, equipped with three devices of FIGS. 1 to 3.

FIG. 6 shows an anti-friction bearing 101 according to the invention, equipped with three cartridges 10 of FIGS. 1 to 3.

Certain component elements of the anti-friction bearing 101 are comparable to the component elements of the anti-friction bearing 1 of the first embodiment, described above, and bear the same references increased by 100. These are the outer ring 102, the tapped orifices 103, the surface 104, the inner space 105, the inner ring 106, the balls 107, and the axis of rotation X101. The differences with respect to the first embodiment are primarily found in the assembly of the anti-friction bearing 101 and the number of cartridges 10.

A shaft 120 is secured to the ring 106, such that the ring 102 is mounted between two portions 130 and 140 of a piece of equipment partially shown. The portion 140 includes a housing 141 in which the cartridges 10 are mounted. Optionally, the housing 141 also includes a miniaturized electronic unit 150, diagrammatically shown by a block in dotted lines, suitable for communicating with the outside of the equipment. This unit 150 is for example a temperature sensor at a given point of the system 1, or a command to ignite charges contained in the cartridges 10. This assembly is shown as a non-limiting example, with the understanding that the anti-friction bearing 101 may be suited to any type of assembly and application.

The three cartridges 10 are fastened to respective orifices 103 formed through the ring 102, near one another. More specifically, the sleeves 30 are screwed into the orifices 103, with the areas Z24 in contact with the surface 104. The proximity between cartridges 10 in particular results from a compromise between their bulk and the production constraints of the tapped orifices 103. Preferably, each of the cartridges 10 is configured to release its fluid after a given temperature or after a certain exposure time to a given temperature. More specifically, the set of cartridges 10 comprises a cartridge 11 configured to trigger first, a cartridge 12 configured to trigger second, and a cartridge 13 configured to trigger third. To that end, the charges of the various cartridges 10 are preferably made up differently from one another, so as to trigger with a time offset. The material thickness of the bodies of various cartridges may also have differences.

FIG. 7 shows a graph illustrating the operation of the system 101 equipped with the cartridges 11, 12, and 13.

The cartridge 11 is triggered at a temperature T21 and a moment t21. After an interval Δt21, the cartridge 12 is triggered at a temperature T22 and a moment t22. After an interval Δt22, the cartridge 13 is triggered at a temperature T23 and a moment t23. After the moment t21, the operating state of the system 101 extends for an interval Δt23. The temperature T21 is below the temperature T22, which is below the temperature T23. The temperatures T21, T22 and in particular the temperature T23 are chosen so that the cartridges 11, 12, 13 trigger before critical heating of the system 101. As an example, the temperatures T21, T22 and T23 are respectively approximately 150° C., 155° C. and 160° C. Thus, the overall state of the system 101 corresponds to the sum of the intervals Δt21, Δt22 and Δt23 and is improved relative to a system equipped with a single cartridge 10.

FIG. 7 intentionally illustrates a non-optimal parameterization of the cartridges 10. In fact, the interval Δt21 is relatively reduced with respect to the intervals Δt22 and Δt23. In other words, the cartridge 12 triggers while the effects of the fluid F delivered by the cartridge 11 may not have dissipated. Preferably, the parameterization of the cartridges 11 to 13 is such that each of the intervals Δt21, Δt22 and Δt23 is maximized, without a cartridge being triggered while the effects of the fluid F delivered by the previous cartridge have not yet dissipated.

Figure 8:
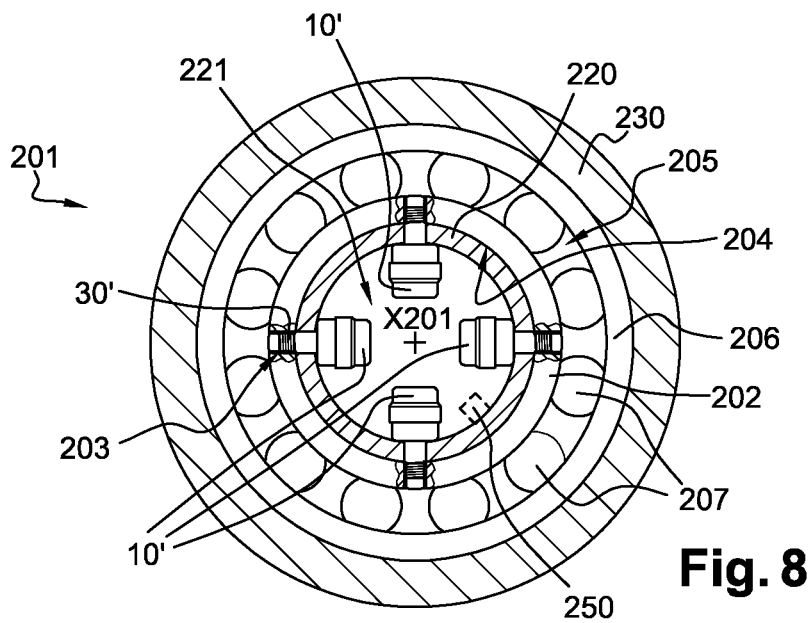
FIG. 8 is a cross-sectional view similar to FIG. 5 of another mechanical system, equipped with four devices according to an example of the invention.

FIG. 8 shows an anti-friction bearing 201 according to the invention equipped with four cartridges 10' according to a second embodiment of the invention. Certain component elements of the anti-friction bearing 201 are comparable to the component elements of the anti-friction bearing 101, described above, and bear the same references increased by 100. These are the inner ring 202, the tapped orifices 203 in the ring 202, the inner surface 204, the inner space 205 of the anti-friction bearing 201, the outer ring 206, the balls 207, and the axis of rotation X201. The differences with respect to the previous embodiment are primarily found in the assembly of the anti-friction bearing 201, as well as the number and configuration of the cartridges 10'.

A stationary hollow shaft 220 is secured to the ring 202, while the ring 206 is secured to a rotating hollow shaft 230. The cartridges 10' are mounted in a bore 221 of the shaft 220, as well as an optional unit 250 comparable to the unit 150 previously described. More specifically, the cartridges 10 are fastened in respective orifices 203 formed through the shaft 220 and the ring 202, while being radially distributed at 90° around the axis X201 of the anti-friction bearing 201 and the shaft 220.

The only difference in the cartridges 10' and the cartridges 10 is that the cartridges 10' are provided with a different sleeve 30' from the sleeve 30. More specifically, the sleeve 30' is more elongated so as to pass through the shaft 220, such that its thread can be screwed into the corresponding orifice 203. The reactivity of the cartridges 10' is slightly reduced due to their distance from the inside 205 and the moving elements 206, 207 of the anti-friction bearing 201, without detriment to the protection of the anti-friction bearing 201. The elongation of the sleeves 30' is required here by the particular assembly of the anti-friction bearing 201.

Other assemblies of mechanical systems equipped with cartridges similar to the cartridges 10 and 10' can be considered without going beyond the scope of the invention. The systems may be associated with one or more cartridges. In particular, several independent cartridges allow a plurality of injections by thermal triggering at least at two different heating temperatures, and at least one location of the system likely to undergo heating.

FIG. 9 shows a third embodiment of a device 310 according to the invention.

Certain component elements of the cartridge 310 are comparable to the component elements of the cartridge 10 of the first embodiment, described above, and bear the same references increased by 300. These are the body 320 centered on an axis X310, the walls 323 and 324, the housing 329, the threaded sleeve 330, the thread 332, the film 334, the duct 336, the charge 340, the reservoir 360, the membrane 368, and the piston 372 for compressing the fluid F in the reservoir 360. The differences relative to the first embodiment are primarily in the structure of the body 320.

The wall 324 of the body 320 forms an outer protruding shoulder relative to the wall 323, such that the heating area Z324 is more expansive than the areas Z24. Alternatively, the wall 324 may be more or less radially extended as a function in particular of the assembly constraints of the cartridge 310. At the membrane 368, the reservoir 360 bears against an inner shoulder 337 of the sleeve 330. The sleeve 330 is more elongated than the sleeve 30, without, however, distancing the membrane 368 from the outlet of the duct 336. When the sleeve 330 is elongated along the axis X310, the reservoir 360 can be elongated accordingly. The cartridge 310 is thus well suited, for example, to the assembly constraints of the system 201 of FIG. 8.

The body 320 does not include a cover 26 and deformable portion 27. The body 320 includes an end 326 opposite the sleeve 30, which is provided with means 350 for signaling the triggering of the charge 340. On the side of the end 326, the housing 328 comprises a bore 327 having a larger diameter than the diameter of the rest of the housing 329. An annular groove 328 is formed in said bore 327. An annular seal 357 is positioned in the bore 327, then a substantially annular glazed element 352 is positioned against the seal 357. Another annular seal 358 is then positioned in the annular groove 328, such that the glazed element is housed between the seals 357 and 358. The state of the charge 340 and/or the combustion gases is thus transparently visible through the glazed element 352. In other words, the combustion of the charge 340 may be detected visually from outside the cartridge 310, for example during a maintenance operation.

In an alternative not shown, the signaling means 350 may be configured differently without going beyond the scope of the invention. For example, the element 352 is not transparent, but made from a heat-sensitive material changing color in contact with the combustion gases.

FIG. 10 shows a fourth embodiment of a cartridge 410 according to the invention.

Certain component elements of the cartridge 410 are comparable to the component elements of the cartridge 10 of the first embodiment, described above, and bear the same references increased by 400. These are the body 420 centered on an axis X410, the base 422, the cover 426, the deformable portion 427, the housing 429, the threaded sleeve 430, the thread 432, the film 434, the duct 436, the shoulder 437, the charge 440, the reservoir 460, the membrane 468, and the piston 472 for compressing the fluid F in the reservoir 460.

The cartridge 410 combines certain elements of the cartridges 10 and 310. In particular, the means for signaling triggering of the charge 440 are made up of the deformable portion 427 integrated into the cover 426, while the sleeve 430 and the reservoir 460 may be more or less elongated along the axis X410.

The cartridge 10 is nevertheless more compact than the cartridges 310 and 410, in the longitudinal direction defined by its central axis X10.

Figure 11:
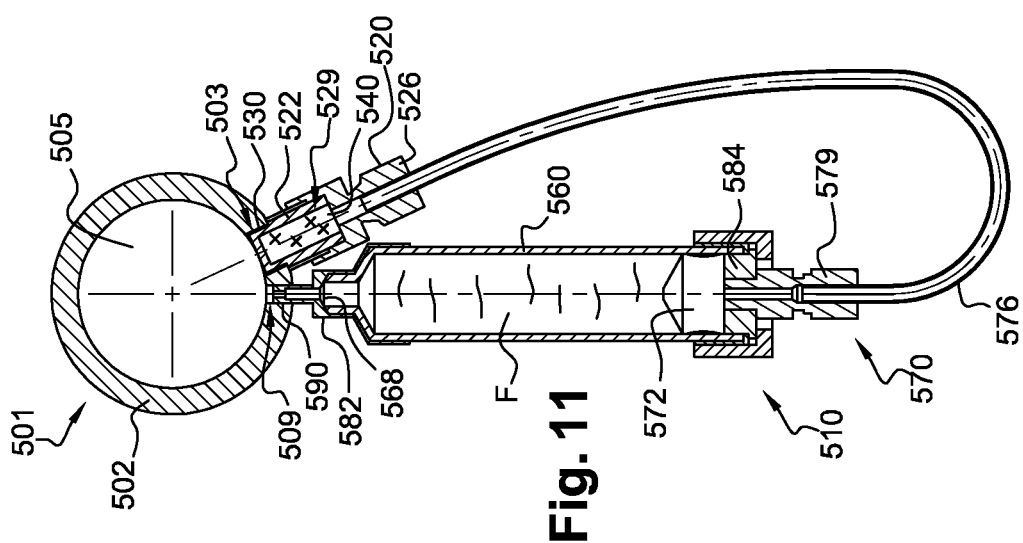
FIG. 11 is a cross-sectional view similar to FIG. 2 of a device according to yet another example of the invention, equipping another mechanical system also according to the invention.

FIG. 11 shows a fifth embodiment of a device 510 equipping a mechanical system 501 according to the invention.

In particular, the device 510 is configured like a syringe, provided with a charge 540 and a reservoir 560 for fluid F that are distant from each other.

Certain component elements of the system 501 and the device 510 are comparable to the component elements of the system 1 and the device 10 of the first embodiment, described above, and bear the same references increased by 500. These are the outer ring 502, the orifice 503, the inside 505 of the system 501, the body 520 delimiting a housing 529 for receiving a charge 540, the base 522, the cover 526, the threaded sleeve 530 secured to the base 522, the reservoir 560, the membrane 568, and the means 570 for compressing the fluid F in the reservoir 560, these means 570 comprising a piston 572.

The reservoir 560 is not positioned in the body 520. Only the charge 540 is arranged in the housing 529 of the body 520, which is fastened in the orifice 503 of the system 501 by the sleeve 530. The reservoir 560 is provided with its own body.

More specifically, the reservoir 560 is arranged between a support assembly 582 situated at its downstream end and a support assembly 584 situated at its upstream end, the upstream and downstream directions being defined by the direction of delivery of the fluid F into the system 501.

The assembly 582 comprises the membrane 568 and a threaded sleeve 590 suitable for being fastened in a tapped orifice 509 of the system 501. The sleeve 590 is an injection sleeve for the fluid F, while the sleeve 530 is an exposure sleeve for the charge 540. The sleeve 590 is comparable to the sleeve 530, both comprising an outer thread and an anti-loosening adhesive film. The diameter of the sleeve 590 is smaller than the diameter of the sleeve 530, and likewise, the diameter of the orifice 509 is smaller than the diameter of the orifice 503. The heating area of the body 520 includes the sleeve 530 and the portion of the base close to that sleeve 530. Thus, the charge 540 and the membrane 568 are positioned near the inside 505 of the system 501, which allows both rapid ignition of the thermally triggered charge 540 and rapid delivery of the fluid F by the membrane 568, as in the preceding embodiments.

In an alternative not shown in FIG. 11, the membrane 568 is positioned in the sleeve 590, in a volume delimited by the contours of the thread of said sleeve 590.

The assembly 584 forms a cover covering the upstream end of the reservoir 560, which is provided with a piston 572. Since the housing 529 is far away from the reservoir 560, a duct 576 connecting the housing 529 and the assembly 584 is provided to guide the combustion gases. The duct 576 extends from the cover 526 configured as a pneumatic connector toward the assembly 584, to which another pneumatic connector 579 is integrated. In other words, the intermediate means 570 for compressing the fluid F in the reservoir 560 comprise the piston 572, the guide duct 576, the connector 579, and the assembly 584.

Advantageously, the device 510 can comprise a significant quantity of fluid F contained in the reservoir 560, so as to be able to protect the system 501 from critical heating over an extended period of time. To that end, the assembly 582, the membrane 568, and the sleeve 590 can be configured to control the flow rate of the fluid F outside the reservoir 560. Thus, when the charge 540 is triggered and the combustion gases bear on the piston 572 while passing through the duct 576, the injection of fluid F into the system 501 can be regulated.

The device 510 is nevertheless more bulky than the miniaturized cartridges 10, 10', 310 and 410. In other words, the device 510 is suitable for particular applications where bulk is not a decisive factor.

Figure 12:
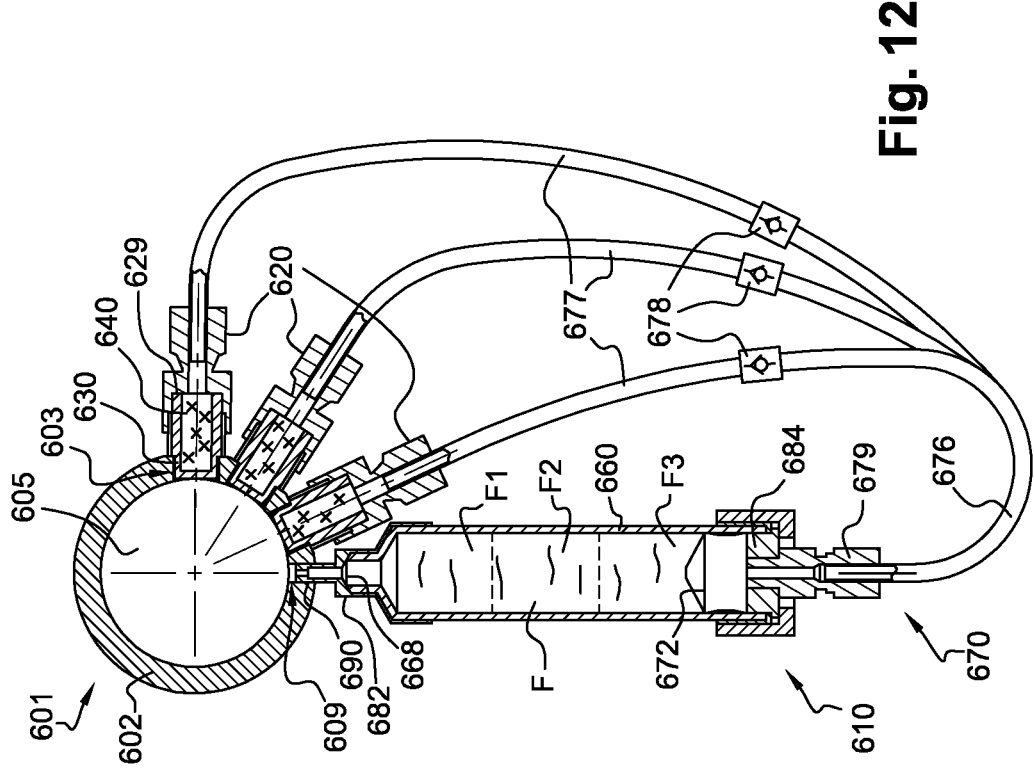
FIG. 12 is a cross-sectional view similar to FIG. 11 of a device according to a an example of the invention, equipping another mechanical system also according to the invention.

FIG. 12 shows a sixth embodiment of a device 610 equipping a mechanical system 601 according to the invention.

In particular, the device 610 is configured like a syringe, provided with several charges 640 distant from the fluid F reservoir 560.

Certain component elements of the system 601 and the device 610 are comparable to the component elements of the system 501 and the device 510 of the fifth embodiment, described above, and bear the same references increased by 100. These are the outer ring 602, the orifice 603, the inside 605 of the system 601, the body 620 delimiting a housing 629 for receiving a charge 640, the threaded sleeve 530 secured to the body 620, the reservoir 660, the membrane 688, the means 670 for compressing the fluid F in the reservoir 660, the piston 672, the duct 676, the connector 679, the support assemblies 682 and 684, and the threaded sleeve 690.

The device 610 comprises three bodies 620, each comprising a housing 629 containing a charge 640. Preferably, the charges 640 are made differently from one another so as to have time-staggered triggering, as in the embodiment of FIGS. 6 and 8. Each body 620 is fastened by a threaded sleeve 630 and an orifice 603 formed in the ring 602 of the system 601. A duct 677 extends outside each housing 629 up to the main duct 676. In this way, each housing 629 is connected to the assembly 684 supporting the reservoir 660 and the piston 672. Preferably, each duct 677 is provided with a unidirectional valve, such that the combustion gases cannot flow back into the other ducts 677.

In particular, the charges 640, the fluid F, and the means for delivering the fluid F can be configured to allow several successive injections of fluid F into the system 601. The volume of fluid F in the reservoir 660 may be divided into several equivalent or distinct volumes F1, F2 and F3. When the first charge is triggered, the volume F1 is injected into the system 601, then the injection is slowed, or even stopped, for example due to the resistance opposed by the piston 672 to the combustion gases. When the second charge is triggered, the volume F2 is injected into the system 601 in turn. When the third charge is triggered, the volume F3 is injected into the system 601 in turn.

Other staged devices may be made, with a different structure but an operation comparable to the device 660, without going beyond the scope of the invention.

In an alternative not shown, each device according to the invention may be provided with a miniaturized electronic unit for transferring information to a remote central unit, by wireless or wired communication. For example, the miniaturized unit may comprise a temperature sensor and/or a pressure sensor arranged in the housing of the charge. The miniaturized unit may also serve as means for signaling triggering of the charge. The miniaturized unit may be supplied with energy by internal means or, alternatively, by the thermal energy given off by the combustion from the charge.

According to another alternative not shown, the devices, and in particular the cartridges, may be positioned on the front surfaces of the anti-friction bearings, or at any point of the mechanical systems adapted to the present application. In the case where the mechanical system is a ball joint, the device may for example be positioned on a housing formed in a tip body.

According to one alternative not shown, at least one positive braking element, for example of the sheet metal brake or lockwire type, may be integrated into the system 1. Each device may be equipped with such an element, so as to prevent it from being unscrewed under the action of the vibrations during operation of the system 1. This element is complementary to the fastening means, i.e. the threaded sleeve and the anti-loosening adhesive film.

Furthermore, all or some of the technical features of the different embodiments may be combined with each other. Thus, the injection device and the mechanical system may be adapted to a particular application, in particular in terms of cost, bulk, and operational constraints.

Whatever the embodiment, the invention may advantageously be implemented in safety, protection, or preventive maintenance contexts for mechanical systems of a nature to undergo heating. In particular, the invention has a reliability and effectiveness adapted to the safety requirements in force in the aeronautic field.

The invention claimed is:

1. A device for injecting a fluid into a mechanical system that may undergo heating, the device comprising:

a body containing a thermally triggered charge generating combustion gas, ignition of the charge being able to be triggered under the action of an ignition command and/or under the effect of a heat contribution, from a heating area of the body toward the charge, a reservoir containing the fluid, a fastener fastening the device to the mechanical system, the fastener adapted to put the reservoir in fluid communication with the mechanical system, and a delivery device delivering pressurized fluid outside the reservoir using combustion gases, wherein the fastener comprise at least one injection sleeve provided with an outer thread coated with an adhesive anti-loosening coating, wherein the injection sleeve is formed from a material having a 0.2% deformation yield strength $Re_{0.2}$ comprised between 500 and 700 MPa, and a tensile strength Rmax comprised between 700 and 900 MPa, wherein the delivery device delivering the pressurized fluid outside the reservoir comprises a non-fragmentable membrane, which initially covers the reservoir and breaks when the pressure of the fluid in the reservoir exceeds a predetermined pressure threshold, wherein the membrane is located in a volume delimited by the outer thread of the injection sleeve, wherein the body includes a deformable portion that is arranged so that a combustion of the charge can be detected visually from outside the device through a deformation of the deformable portion under the effect of a pressure inside the body, when the combustion gas is diffused inside the body, wherein the flow rate of the pressurized fluid outside the reservoir is regulated, with at least one of:

a periodic delivery of fluid over a reduced time interval, shorter than five seconds;

a regular and continuous delivery of fluid over a period of several minutes; or an intermittent delivery of fluid, through successive injections, over several minutes.

2. The device according to claim 1, wherein:

the reservoir is housed in the body containing the charge, a moving piston is inserted between the fluid and the charge, and the injection sleeve protrudes from the body at the heating area of the body.

3. The device according to claim 1, wherein the device comprises a signal signaling the combustion of the charge.

4. The device according to claim 1, wherein the device comprises a miniaturized electronic unit transferring information to a remote central unit.

5. The device according to claim 1, wherein the device is autonomous, the ignition of the charge being able to be triggered only under the effect of a heat contribution, from a heating area of the body, toward the charge.

6. A mechanical system, comprising an anti-friction bearing, a main bearing, or a ball joint, wherein the system is equipped with at least one device according to claim 1.

7. The mechanical system according to claim 6, wherein the injection sleeve of the device is screwed into a tapped orifice formed in the mechanical system.

8. The mechanical system according to claim 7, wherein the tapped orifice is formed in a part of the system made from a steel having a tensile strength comprised between 2400 and 2600 megapascal (MPa).

9. The mechanical system according to claim 6, further comprising several devices each provided with at least one charge having a different triggering temperature from the other charges.

10. The mechanical system according to claim 6, wherein at least one positive braking element cooperating with a device is integrated into the mechanical system.

11. The mechanical system according to claim 10, wherein the positive braking element is of the sheet metal brake type.

12. The mechanical system according to claim 10, wherein the positive braking element is of the lockwire type.

\* \* \* \* \*